Patented Dec. 13, 1927.

1,652,791

UNITED STATES PATENT OFFICE.

FRANK J. MORISETTE AND ALBERT SCHINKEZ, OF DETROIT, MICHIGAN.

MEANS AND METHOD FOR ASSEMBLING AUTOMOBILE SPRINGS.

Application filed April 23, 1926. Serial No. 104,138.

It is the primary object of our invention to provide means whereby a pair of automobile springs may be easily and quickly assembled to an automobile frame.

A further object of our invention is to provide a device for setting automobile springs, that will deflect the springs into approximately the ultimate position they take when assembled to a frame and an automobile body is positioned on the same.

Another object of our invention is to provide a device for setting springs into rubber insulators positioned in housings secured to an automobile frame.

It is also an object of our invention to provide a device of simple and economical structure that will decrease the time and labor required to set a pair of automobile springs into rubber insulators placed in housings directly attached to an automobile frame.

With the above and other objects, our invention consists in the arrangement, combination and construction of the various parts of our improved device, and the methods utilized therein, as described in the specification, claimed in our claims, and shown in the accompanying drawings, in which;

Figure 1:
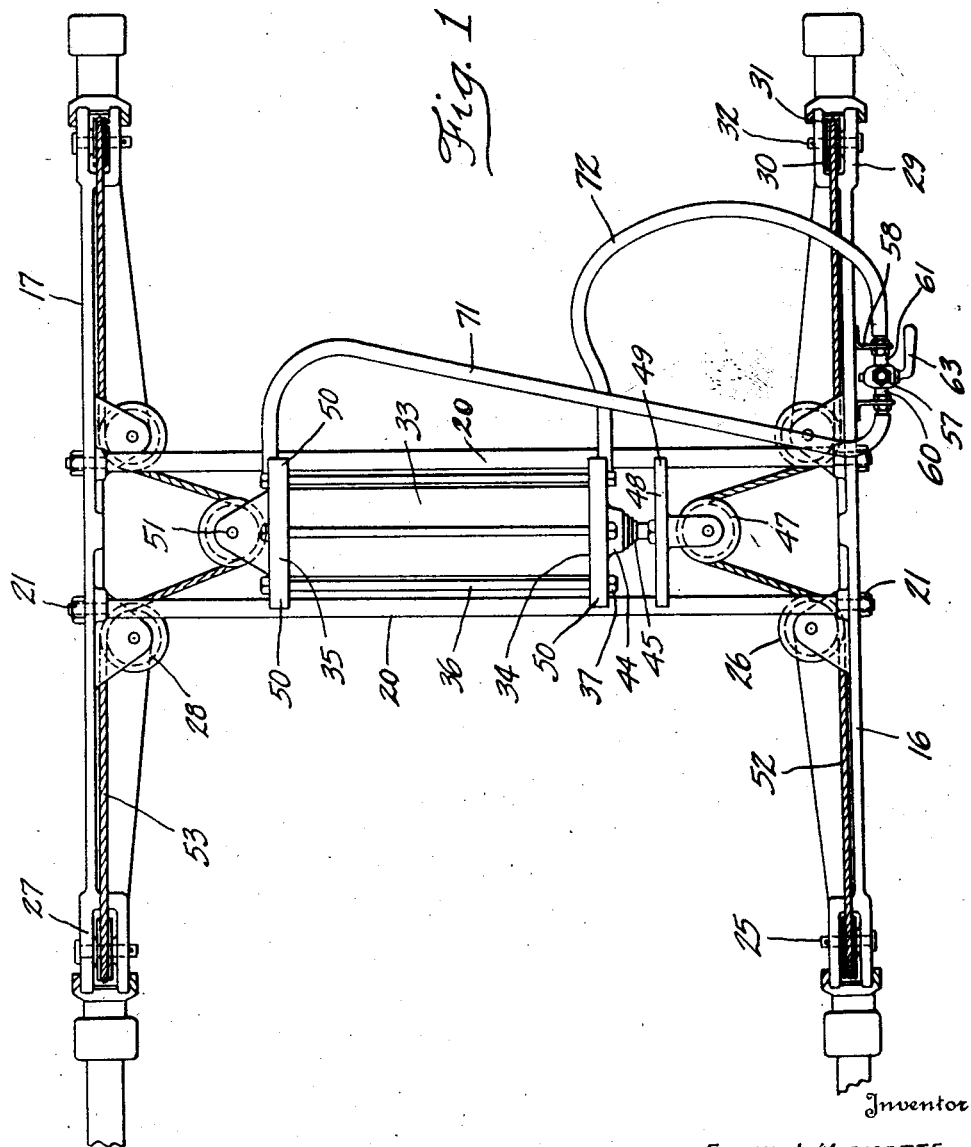
Fig. 1 is a plan view of our improved device shown positioned over the rear portion of an automobile frame with rubber insulator housings attached thereto.

We have shown the rear portion 10 of an automobile frame having rubber insulator housings 11 secured to the ends and intermediate the ends thereof. A conventional rear axle 13 is secured by shackles 14 to a conventional spring 15 that is compressed by our improved device to fit into rubber insulators in the housings 11.

In the construction of our improved device, we provide a frame member 16 held in parallel relation with a corresponding frame member 17 by a transverse plate 18 secured to shoulders 19 on the inner faces of the members 16 and 17 and by cross bars 20 that extend through the members and are secured by nuts 21. The bottoms of the members 16 and 17 have flanged portions 22 adapted to be evenly spaced from the ends of the top leaves 23 of the springs 15. A hanger member 75 is secured by means of the cotter keys 76 to the top portions of frames 16 and 17.

Positioned vertically adjacent downwardly projecting end portions 24 of the member 16 are the pulleys 25 and positioned horizontally on the inner face of the member 16 adjacent an aperture 12 are the pulleys 26. Likewise positioned vertically on the member 17 are the pulleys 27. Pulleys 28 are placed on the inner face of the member 17 adjacent a corresponding aperture 12. These pulleys are formed by parallel yokes 29 integral with the members 16 and 17 and rollers 30, having a groove 31, and rotatably secured between the yokes 29 by pins 32.

A cylinder 33 having a front head 34 and a rear head 35 secured by stud bolts 36 and nuts 37, is positioned for reciprocation on the bars 20 by means of ears 50 integral with the heads 34 and 35. Placed for reciprocation in the cylinder is a piston 38 that has secured to it by a nut 39, flanged cups 40 of leather or any other suitable material, which bear against the inner walls of the cylinder. A piston rod 41 connected to the piston 38 by a nut 42 extends through an aperture 43 and a packing gland 44 in the head 34. An insert nut 45 holds packing 46 in the gland air-tight around the rod 41.

Secured to the end of the rod 41 is a horizontal pulley 47 that has a cross member 48 with ends 49 adapted to bear against and reciprocate on the bars 20. Another pulley 51 is secured to the head 35.

A cable 52 having its ends extending vertically from the ends 24 of the frame member 16, passes through the pulleys 25, 26 and 47. In like manner a corresponding cable 53 with its ends extending from the frame member 17, passes through the pulleys 27, 28 and 51. Secured to the ends of the cables 52 and 53 are hooked members 54. These hooked members 54 are provided with pawls 55 for clamping around an article and with flanged heads 56 that may bear against the end portions 24 of the frames 16 and 17.

A four-way valve 57 is secured on the member 16 by brackets 58. This valve has an inlet 59, distributing passages 60 and 61, an air outlet 62 and a handle 63 for opening and closing the passages. Passage 60 is connected by hose 71 to an inlet in head 35 and passage 61 is connected to an inlet in the head 34 by hose 72. The valve inlet 59 is connected by a feed line 73 to a source of air.

In the practical operation of our improved device, pawls 55 of the hooked members 54 are placed around the springs 15 and the projections 22 of the frame members 16 and 17 rest on the top leaves 23 of the springs.

Figure 2:
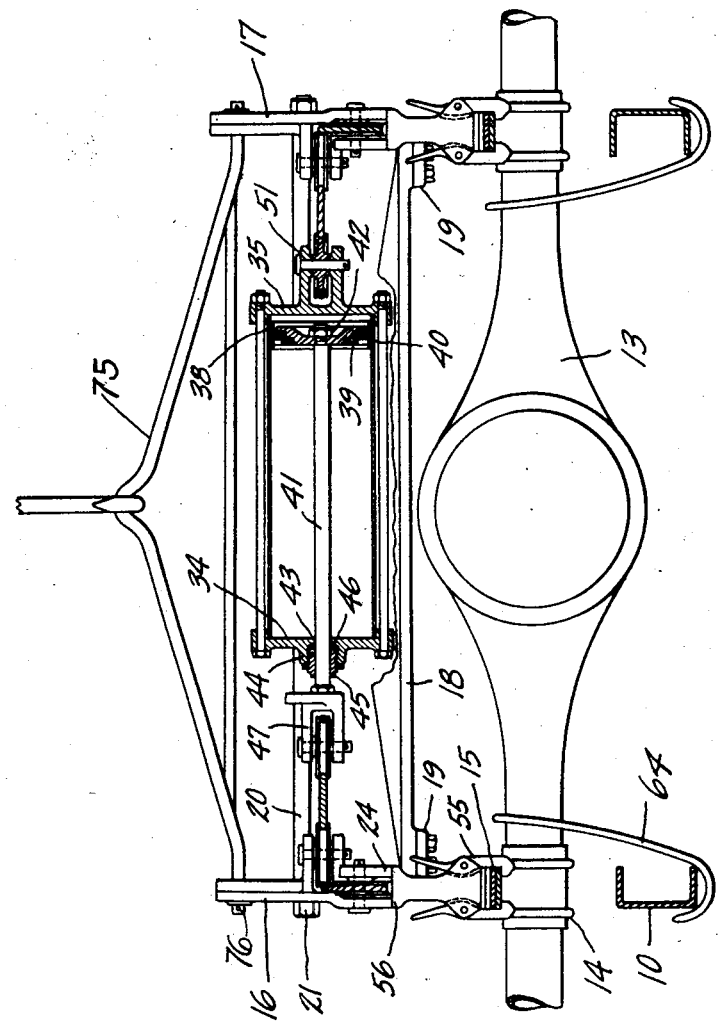
Fig. 2 is an end view of our improved device shown partly in section.
Figure 3:
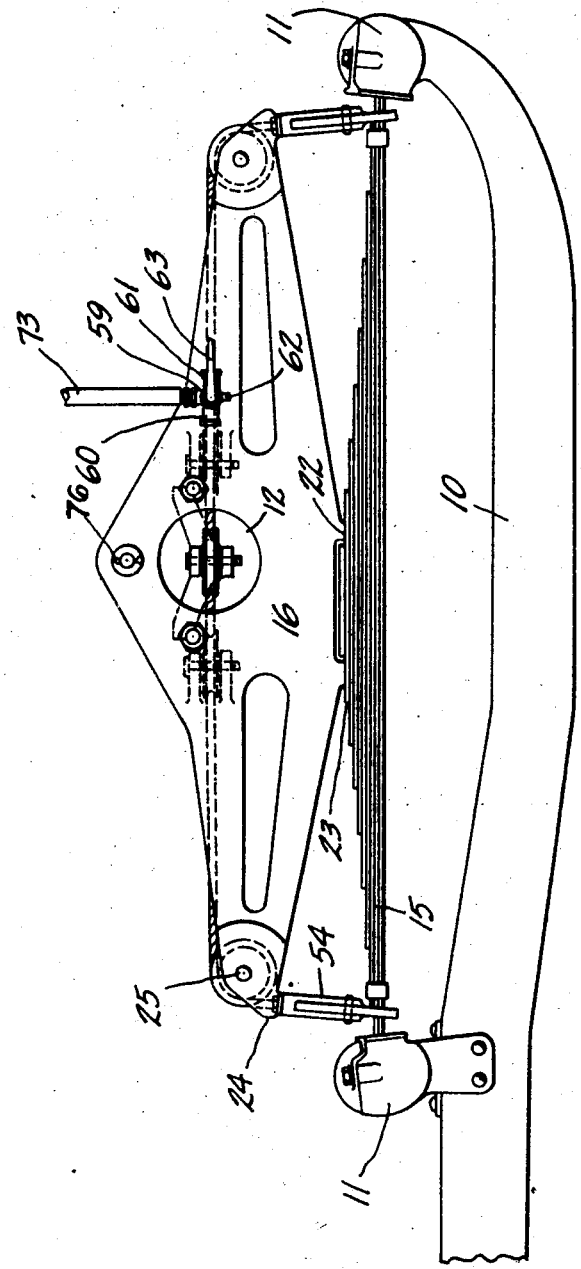
Fig. 3 is a side elevation of an improved device.

The valve 57 is then operated to admit air through the head 34 into the cylinder 33 so that the cylinder and the piston simultaneously reciprocate inwardly in opposite directions, drawing in the cables 52 and 53 on the axis of the pulleys 25, 26 and 47 and the pulleys 27, 28 and 51 respectively. These pulleys are arranged to provide a straight upward movement of the hook members 54 which, in turn, deflect the spring until the leaves thereof are approximately straight and the flanged ends 56 of the hooks rest against the projecting portions 24 of the frame members 16 and 17. Equalized pull is, of course, effected through the cables so that both springs will be held under the same tension. While the spring is in this position, it is set into rubber insulators in the housing 11. Hooks 64 are then placed around the axle housing 13 and frame 10 as shown in Fig. 2 to keep the springs deflected until a body is assembled to the frame. The weight of the body then maintains the springs in position in the housings 11.

To release the hook members 54 the valve 57 is operated to close the passage 61 to the air supply and open the same to the outlet passage 62, at the same time the passage 60 is opened to the air inlet passage 59 and closed to the outlet passage 62, permitting air to enter through the head 34 into the cylinder 33 back of the piston 38 thus forcing both the piston and the cylinder in an outward direction releasing the tension on the cables 52 and 53 at which points the pawls 55 may be easily removed from the springs. The air contained in the cylinder 33 before the piston 38 is forced through the hose 72 through the passage 60 and to the outlet 67. The apertures 12 allow the pulleys 47 and 51 to be forced beyond the limits of the frame members 16 and 17.

It will be obvious that various changes may be made in the arrangement, combination and construction of the various parts of our improved device without departing from the spirit of our invention, and it is our intention to cover by our claims such changes as may be reasonably included within the scope thereof.

What we claim is:

1. A device of the class described comprising a pair of frame members, each adapted to receive a spring, a transverse plate holding said members in parallel relation and means adapted to compress springs bearing against a portion of said frame members.

2. A device of the class described comprising a pair of frame members, a transverse plate holding said members in parallel relation, cables having their ends extending downwardly from the ends of said members, means for positioning said cables and means for moving said cables on said positioning means.

3. A construction as set forth in claim 2 wherein a cylinder having a piston with a piston rod is adapted to move said cables.

4. A device of the class described comprising a pair of frame members, a transverse plate securing said members in parallel relation, cables, pulleys on said members positioning said cables with the ends thereof extending vertically from the ends of said frame members, a cylinder having a piston therein adapted to move said cables, means adapted to reciprocate said piston and cylinder in opposite directions, and means secured to the ends of said cables for attaching the same to a spring.

5. A device of the class described comprising a pair of frame members, a transverse plate securing said members in parallel relation to each other, cross bars extending between said frame members, a cylinder positioned for reciprocation on said bars, a piston in said cylinder having a piston rod extending through one end of said cylinder, means for simultaneously reciprocating said piston and cylinder and means adapted to be moved by said piston rod and cylinder for compressing springs against said frame members.

6. The method of mounting a pair of springs on opposite sides of a chassis frame which consists in simultaneously deflecting the springs free from the chassis frame and then securing the springs to the frame while they are under deflection.

7. The method of mounting a pair of springs on opposite sides of a chassis frame which consists in simultaneously deflecting the springs free from the chassis frame to an equal degree and then securing the springs to the frame while they are under deflection.

8. A device of the class described comprising a pair of frame members, a transverse plate securing said members in parallel relation to each other, cross bars extending between and secured to said frame members and a cylinder positioned for reciprocation on said bars, a piston having a piston rod extending through one end of said cylinder adapted to be reciprocated in said cylinder, means for simultaneously reciprocating said cylinder, piston and piston rod, cables positioned on said frame, means connecting the cables to the cylinder and rod, whereby the end portions of said cables may be moved vertically by the reciprocation of said cylinder and piston rod, and springs connected at their ends to the ends of said cables.

9. A construction as set forth in claim 8 wherein pulleys are placed on said frame members to position said cables with their ends extending downwardly from the ends of said members and their central portions adapted to be moved horizontally by the reciprocation of said cylinder and piston rod.

10. A device of the class described comprising a pair of frame members, a transverse plate securing said members in parallel relation to each other, cross bars extending between and supported by said frame members, a cylinder positioned for reciprocation on said bars, a piston having a piston rod extending through the front end of said cylinder adapted to be reciprocated in said cylinder, means for simultaneously reciprocating said cylinder and said piston with the piston rod back and forth in opposite directions, a cross member having a pulley integral therewith secured to said piston rod and adapted to reciprocate on said cross bars, a pulley secured to the rear end of said cylinder and cables running through said pulleys and positioned on said frame members with their ends extending downwardly from the ends of said members whereby said cable ends are moved vertically when said cylinder and piston rod are reciprocated.

11. A device of the class described comprising frame members, a transverse plate securing said members in parallel relation with each other, cross bars extending between and secured to said members, a cylinder positioned for reciprocation on said bars, a piston having a piston rod extending through the front head of said cylinder adapted to be reciprocated in said cylinder, means for reciprocating the cylinder and the piston with the piston rod in opposite directions, a pulley secured to one end of said piston rod, and another pulley secured to the rear head of said cylinder, pulleys on said frame members, cables running through the pulleys on one member and the pulley on said piston rod, a second cable running through the pulleys on the other member and through the pulley secured to the cylinder head, hook members on the ends of said cables, said pulleys being arranged to permit said cables to extend downwardly from the ends of the frame members thereby allowing vertical movement of said hooks when said cylinder and piston rod are reciprocated to move the cables on the axis of said pulleys.

12. A device of the class described comprising a pair of frame members, a transverse plate securing said members in parallel relation with each other, pulleys on said members, cables running through the pulleys on each member, said pulleys being arranged to allow the ends of said cables to extend downwardly from the ends of said members, hook members on the ends of said cables and means for moving said cables on the axis of said pulleys thereby raising and lowering said hook members.

13. A device of the class described comprising a pair of frame members, a transverse plate and cross bars securing said members in parallel relation with each other, pulleys on said members, cables running through the pulleys on each member, said pulleys being arranged to allow the ends of said cables to extend downwardly from the ends of said members, hook members on the ends of said cables and means for moving said cables on the axis of said pulleys thereby raising and lowering said hook members, said means consisting of a cylinder positioned for reciprocation on said bars, a piston having a piston rod extending through the front head of said cylinder placed for reciprocation in the cylinder, a pulley member secured to said piston rod and a pulley secured to the rear head of said cylinder, one of said cables running through the pulley on said member and a second cable through the pulley on the cylinder head, air passages in the cylinder heads and means adapted to alternately admit air under pressure in front of and in back of said piston to simultaneously reciprocate said piston rod and cylinder in opposite directions thereby moving said cables on the axis of said pulleys.

14. A device of the class described comprising a pair of frame members, a transverse plate securing said members in parallel relation with each other, cross bars extending between and secured to said members, a cylinder, flanged ears on the front and rear heads of said cylinder positioning the same for reciprocation on said cross bars, a piston adapted to reciprocate in said cylinder, air passages in the cylinder heads, and means for alternating the admission and emission of air under pressure through said passages in front of and in back of said piston thereby reciprocating the piston and cylinder back and forth in opposite directions.

15. A device of the class described comprising a pair of horizontally arranged parallel frame members each adapted to receive a spring, a transverse member holding said members in parallel relation, and means adapted to compress the springs.

16. A device of the class described comprising a pair of horizontally arranged parallel frame members each adapted to receive a spring, a transverse member holding said members in parallel relation, and means adapted to compress the springs, said means including equalizing means balancing the amount of deflection of the springs.

FRANK J. MORISETTE.
ALBERT SCHINKEZ.